March 23, 1937.  H. F. KOLB  2,074,476
AUTOMOBILE DRIVE SYSTEM
Filed June 30, 1932    5 Sheets-Sheet 1
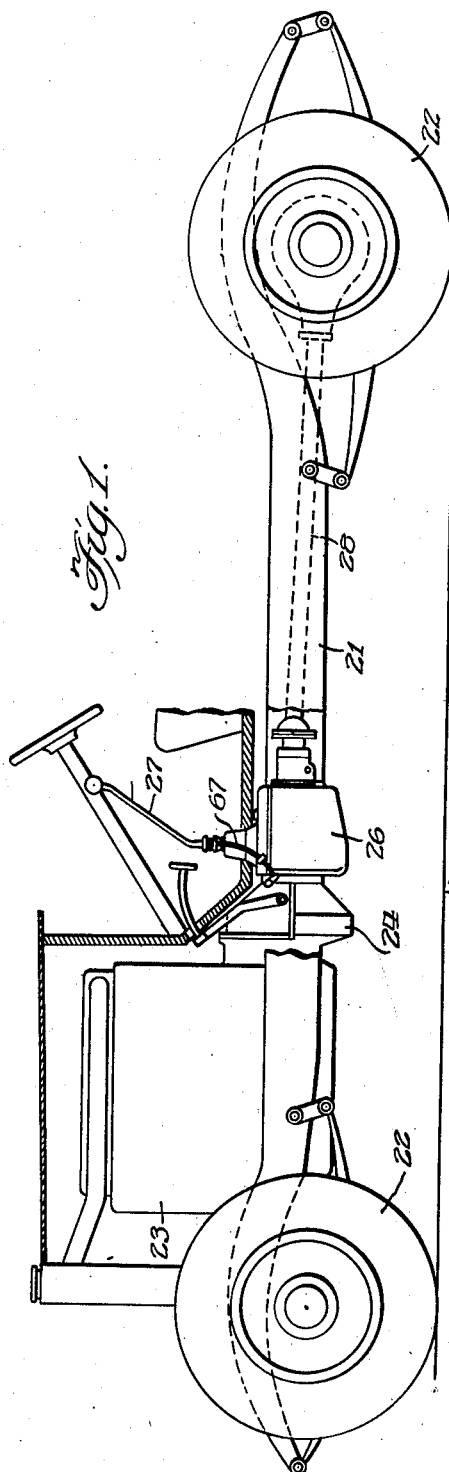
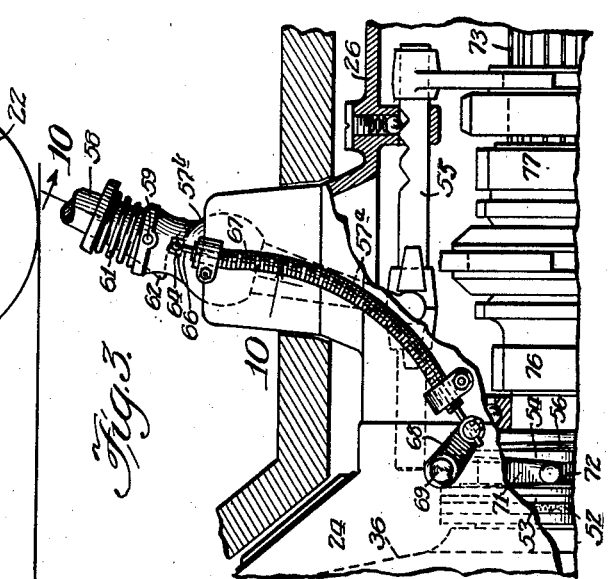
Inventor
Hans F. Kolb.
By Mueller & McLaughlin
Attys.

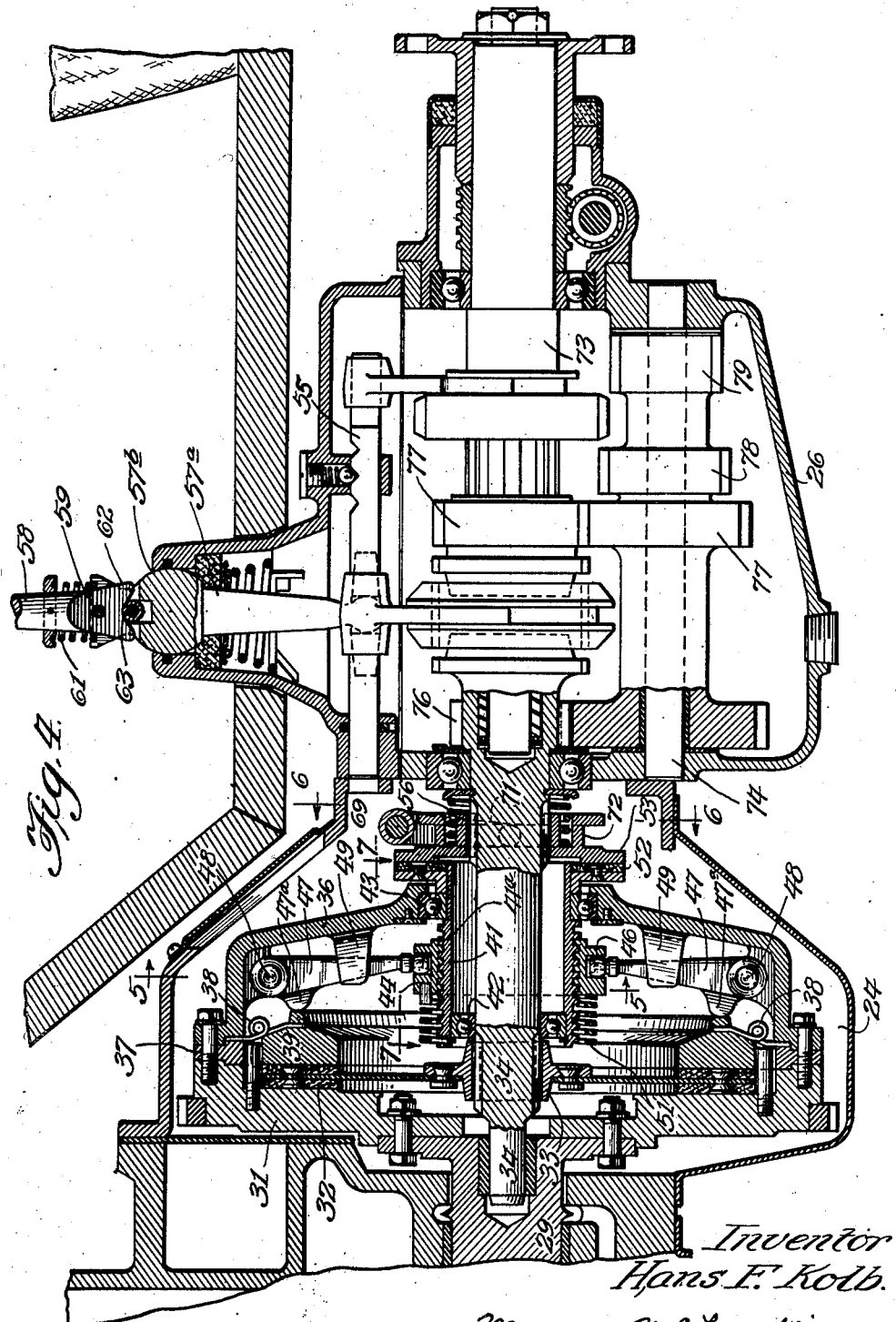

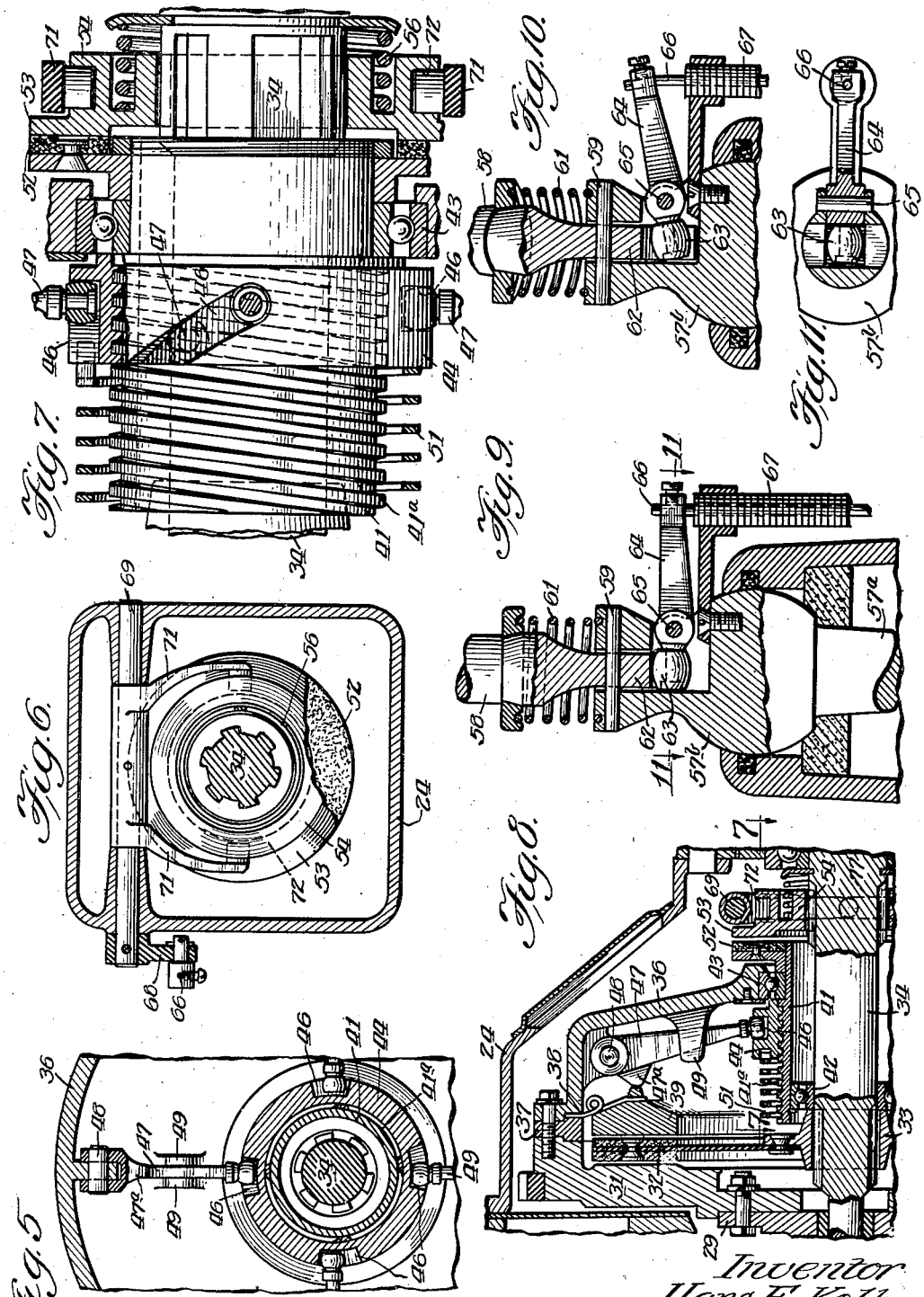

March 23, 1937.　　　H. F. KOLB　　　2,074,476
AUTOMOBILE DRIVE SYSTEM
Filed June 30, 1932　　　5 Sheets-Sheet 4
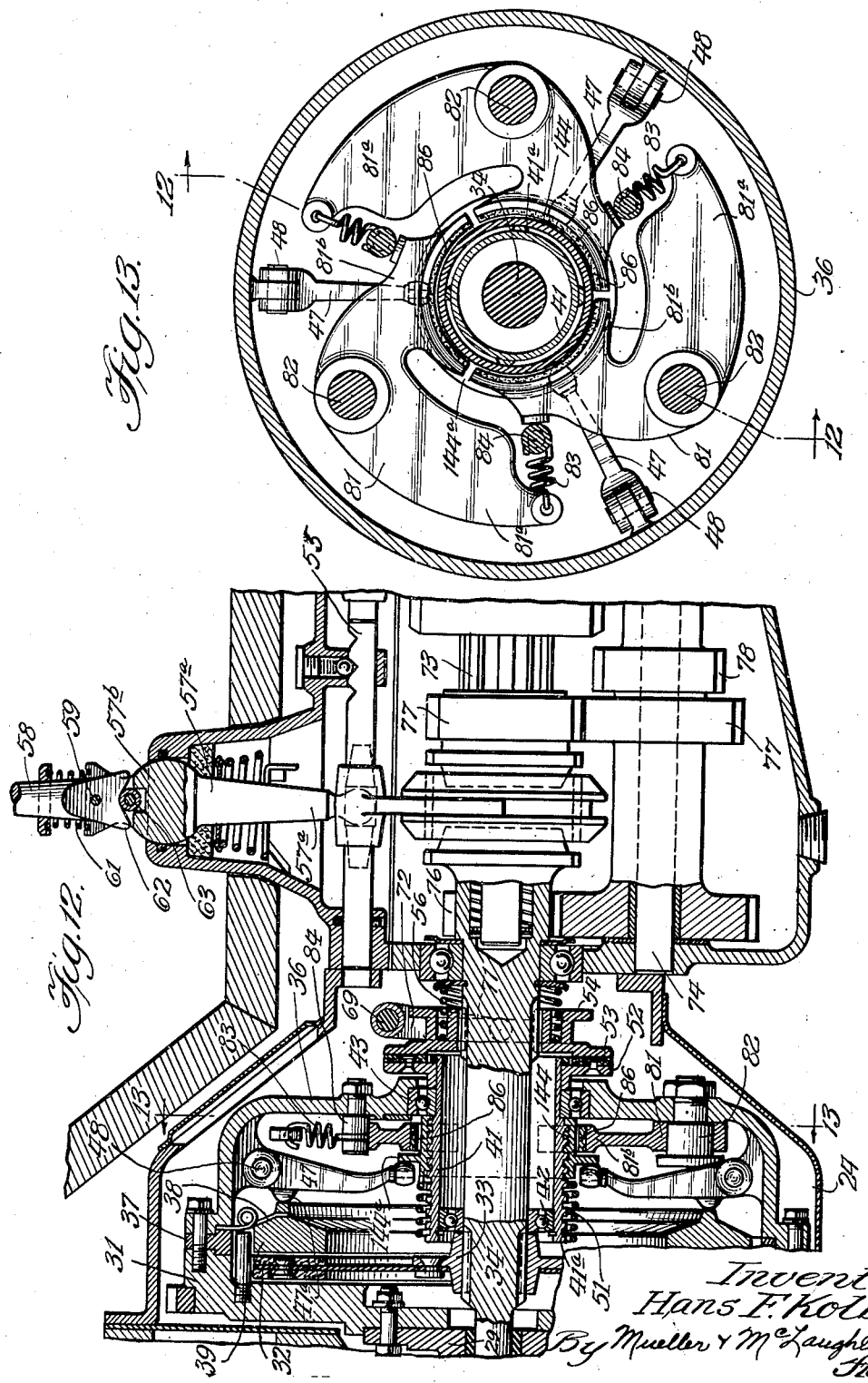
Inventor
Hans F. Kolb.
By Mueller & McLaughlin
Attys

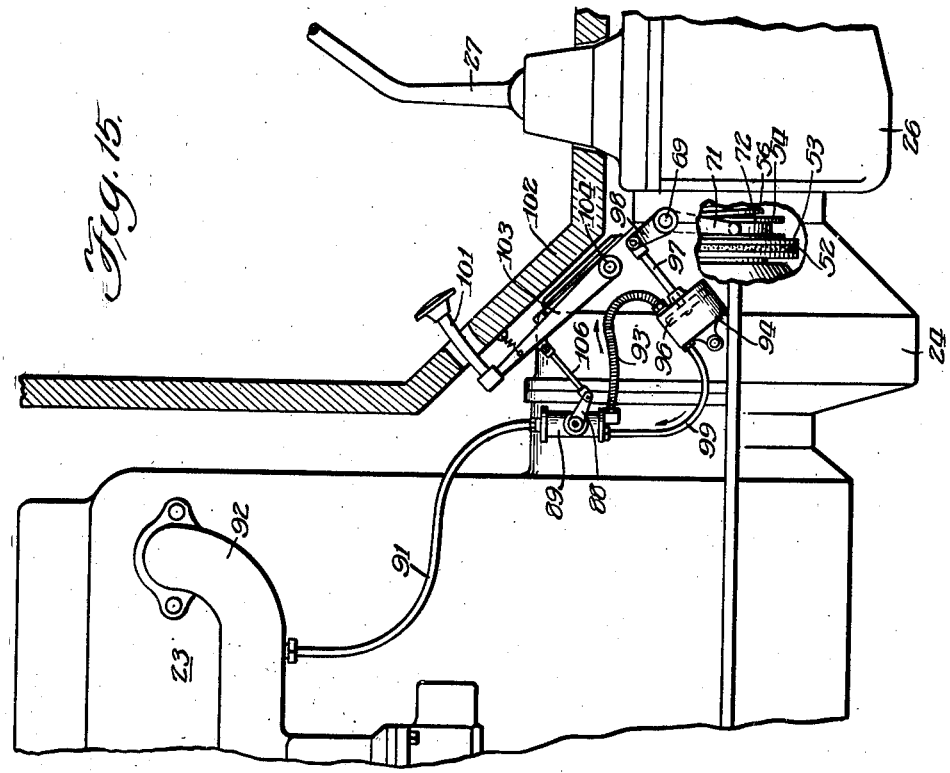
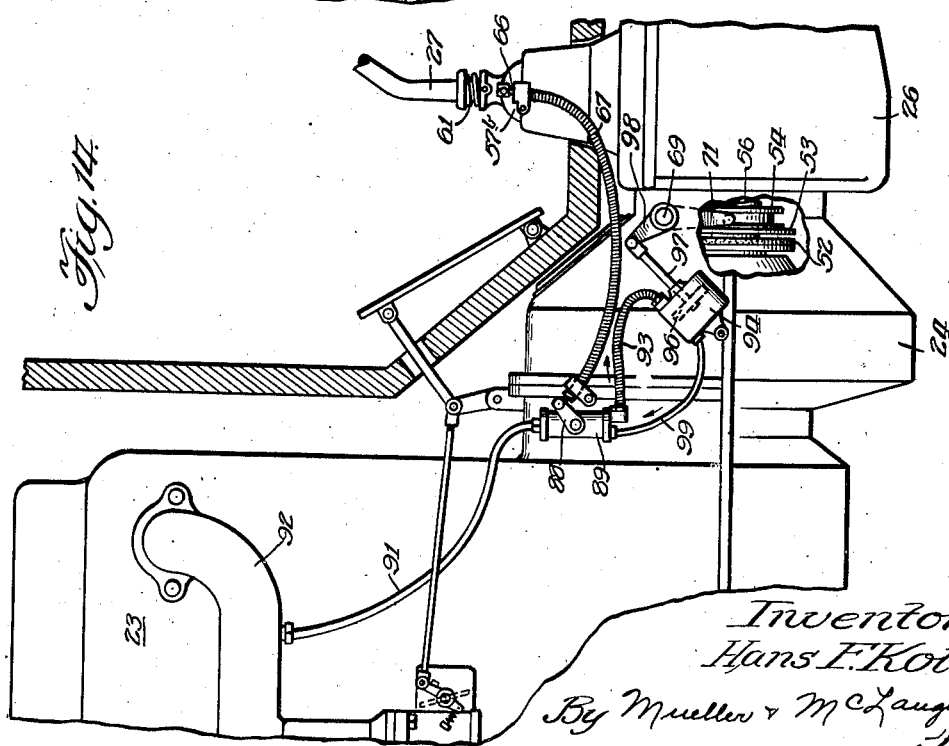

Patented Mar. 23, 1937

2,074,476

UNITED STATES PATENT OFFICE 2,074,476

AUTOMOBILE DRIVE SYSTEM

Hans F. Kolb, Chicago, Ill.

Application June 30, 1932, Serial No. 620,154

15 Claims. (Cl. 192—3.5)

My invention relates to an improved automobile drive system.

The principal object of the invention is the provision of an improved clutch and transmission combination for use in a motor vehicle.

Another object is the provision of an improved automatic clutch.

Another object is the provision of an automatic clutch which will cause a minimum of wear on the clutch surfaces.

Another object is the provision of an automatic clutch adapted for use with the usual free-wheeling systems.

Another object is the provision of an automatic clutch which will be positive acting throughout.

Another object is the provision of an automatic clutch which may be actuated by the usual gear shift lever.

Another object is the provision of a full automatic clutch having a relatively small number of moving parts.

Other objects and features of the invention will be apparent from a consideration of the following detailed description, taken with the accompanying drawings, wherein, Fig. 1 is an elevational view showing a part of an automobile chassis with my invention applied thereto;

Fig. 2 is an enlarged fragmentary view showing one control means for the automatic clutch;

Fig. 3 is a similar view showing the parts in a different adjustment;

Fig. 4 is an enlarged vertical sectional view showing the automatic clutch in combination with a transmission;

Figs. 5 and 6 are fragmentary transverse sectional views taken on the lines 5—5 and 6—6 respectively of Fig. 4;

Fig. 7 is an enlarged fragmentary plan section taken along the line 7—7 of Fig. 4, showing a part of the automatic clutch in full lines;

Fig. 8 is a fragmentary elevational view similar to Fig. 4, but showing the parts in a different adjustment;

Figs. 9, 10 and 11 are enlarged detail views of the gear shift control;

Fig. 12 is an elevational view partly in section showing a modification of the invention, the section being taken on the line 12—12 of Fig. 13, looking in the direction of the arrows;

Fig. 13 is a transverse sectional view taken on the line 13—13 of Fig. 12; and

Figs. 14 and 15 are elevational views partly broken away showing modifications of the clutch control.

The invention is adapted for application to the usual automobile shown in Fig. 1, having a chassis 21, wheels 22, motor 23, flywheel and clutch housing 24, transmission 26 operated by the shift lever 27 and propeller or drive shaft 28.

I shall first describe the automatic clutch per se as shown particularly in Figs. 4 to 8, inclusive. A shaft 29 which may be the engine crank shaft or an extension thereof, has a flywheel 31 bolted thereto, the flywheel having one face finished to form the driving clutch plate and adapted to impart its motion to a shiftable clutch plate 32 secured to a hub 33 splined on the shaft 34. A clutch housing 36 is bolted to the flywheel with a spacer 37 therebetween, the housing and spacer being formed to support springs 38 which engage a pressure ring 39 normally to hold it away from the shiftable clutch plate 32. My improved clutch provides automatic means for forcing the pressure plate against the shiftable clutch plate to cause it to engage the main clutch plate on the flywheel, or to allow the pressure ring to be removed from the shiftable clutch plate by the springs 38, this automatic control being effected through means to be described.

Surrounding the shaft 34 is a sleeve 41 having a bearing 42 and a bearing 43 to center the sleeve with respect to the shaft and with respect to the housing 36. The sleeve is provided with a left hand thread 41a on which a nut 44 is threaded, the nut having a plurality of cam slots 46 in which rollers provided on the ends of actuating arms 47 extend. These actuating arms are pivoted to the housing at 48 and are movable about their pivots between pairs of guides 49 on the clutch housing. A coil spring 51 has one end secured to the sleeve and the opposite end secured to the nut 44. In its normal position, that is, with no tension or pressure on the spring, the nut occupies substantially the position shown in Fig. 8. The arms 47 are provided with cam-like bosses or engaging projections 47a adapted to engage an annular extension of the pressure ring. It is clear, then, that when the nut 44 is moved so as to actuate the arms 47 in one direction about their pivots, it will have the effect of forcing the pressure ring against the shiftable clutch plate and engage the clutch. On the other hand, when the arms then move in the opposite direction, they will separate the pressure ring away from the shiftable clutch plate and disengage the main clutch plate.

I may provide various mechanical means for obtaining this result. In the present form of the invention, I provide an auxiliary clutch comprising a small clutch plate 52 supported by the sleeve 41, and a co-operating plate 53 carried by a clutch member 54 splined on a portion of the shaft 34 outside of the clutch housing. The member 54 urged by a spring 56 normally is held in a position to engage the auxiliary clutch faces. Means is provided, however, for disengaging this auxiliary clutch to have an effect under certain conditions as will be pointed out to actuate the nut so as to disengage the main clutch plates.

A special type of gear shift lever is provided comprising a lower lever 57a provided with a ball 57b supported in a portion of the transmission housing to have a universal movement. The lower portion of the lever 57a has the usual connection to a transmission shift rod 55. An upper lever 58 is pivoted to a bifurcated portion of the lower lever by a pin 59, an intervening compression spring 61 tending to maintain the axes of the two shafts in alignment. The lower portion of the upper lever is provided with a double acting cam 62 which engages a roller 63 mounted on one end of a short arm 64, this short arm being pivoted to the lower lever at 65. The arm 64 has secured to its upper end a cable 66, and a cable sheath 67 has one end supported by the lower lever 57a and the opposite end supported at a suitable point on the transmission housing. The opposite end of the cable is secured to a short arm 68 (Figs. 2 and 3), this short arm being pinned to a short transverse rocking shaft 69 having a pair of arms 71 (Fig. 6) with fingers extending into an annular slot 72 in the auxiliary clutch member 54. When the gears are shifted, the double lever arrangement in the gear shift lever functions in a manner to be described to draw on the cable 66 and separate the two auxiliary clutch members.

Any suitable transmission may be employed with the automatic clutch of my invention. In general, however, I prefer an arrangement in which the clutch and transmission are mounted together as shown in Fig. 4, and a standard type of transmission is also preferable for my purpose. The transmission shown is a conventional type of synchronous transmission and includes a main drive shaft 73 and a counter shaft 74, with the usual types of gears, including high 76, two second gears 77, low gear 78 and reverse 79. As far as the reverse gear goes, it is understood that a co-operating gear, not shown in the present drawings, is employed to transmit the motion from the reverse gear to the main drive shaft. These gears are meshed by means of the shift lever with the conventional type of shift represented in neutral position in Figs. 2 and 4. In Fig. 3 I show the position which the parts take just before the gears are finally meshed for low speed drive. In this position, as will be made more clear from the description of the operation of the invention, the auxiliary clutch is disengaged by the differential action between the upper and lower sections of the shift lever.

Before proceeding to a description of the modifications, I shall describe the manner in which the preferred form of automatic clutch operates.

In neutral position, with the motor shut off, the parts are all in the position indicated in Fig. 4, with the exception that the main clutch plate is disengaged and the nut 44 is back against the raised end thread on the sleeve 41 which acts as a stop. This position of the nut is shown in Fig. 8.

At this position, there is no tension on the spring 51 and the nut 44 is at its normal position. Assume now that the motor is started. The flywheel, including the main clutch plate and housing, will rotate at engine speed. Arms 47 travelling with the housing cause the nut 44 to rotate by engaging in the ends of the cam slots 46, at this time occupying the position shown in Fig. 7. The nut in turn will drive sleeve 41 through spring 51 and, since the sleeve is connected to shaft 34 through the auxiliary clutch, it will cause a turning movement of the shaft 34 and the portion of the transmission directly connected thereto. Under the usual conditions existing in an automobile transmission, there will be enough drag on the shaft 34 so that the nut 44 will tend to run ahead of the sleeve 41 against the action of spring 51. This will cause the nut 44 to be moved in a left hand direction (looking at Fig. 4), which in turn will carry the arms in a direction so that the bosses 47a will force the pressure plate or pressure ring 39 against the shiftable clutch plate and engage the main clutch plate. Thereafter all of the parts turn in unison independent of the speed at which the motor is turning over. It may be stated that the spring 51 can be made to have sufficient resistance to movement so that the ordinary friction of the shaft 34 and associated portions of the transmission will not be sufficient to engage the clutch. I prefer however to have this spring rather too light than too strong to insure engagement even though the load on the wheels during driving is relatively light.

Assume now that the driver wishes to go into low speed. As in the usual transmission, the gear shift lever is pulled slightly to the left and then drawn backwardly to engage the gears. As the gear shift lever is drawn back, the first action is a movement of the upper gear shift lever about its pivot 59, thus causing the cam 62 to depress the end of the arm 64, which it engages, and draw up on the cable 66, which through the connections shown, including the arms 71 and associated fingers, withdraws the auxiliary clutch member 54 until the auxiliary clutch member is disengaged.

The sleeve 41 now being disengaged from the shaft 34 is free to turn with the nut 44 without any resistance. Since these two members turn together, they are stationary with respect to each other and the spring 51 will then uncoil itself sufficiently to propel the nut back toward its stop or, in other words, to the position shown in Fig. 7. This movement is assisted by the springs 38 which at all times tend to withdraw the pressure plate from the shiftable clutch plate and move the arms through the bosses 47a. The main shiftable clutch plate, therefore, is disengaged before the transmission is moved to engage the gears. The position of the parts at this time is illustrated in Fig. 8.

As soon as the driver releases the gear shift lever, the clutch member 54 is allowed to return by pressure of the spring 56 to engage the auxiliary clutch and cause a resistance to turning movement of the sleeve 41 which is now directly connected back to the rear wheels. The arms 47 again turn the nut 44 on its threads to engage the main clutch in the manner previously described. Shifting to second and third gear and to reverse as well is accomplished in the same way with the same operation of the parts.

I now come to the condition in which there is a tendency for the car to drive the motor which occurs in coasting when no freewheeling unit is employed, at which time the motor acts as a brake. At this time there is a tendency for the shaft 34 to overrun the shaft 29. With the auxiliary clutch engaged, however, all movement of the shaft 34 is accompanied by corresponding movement of the remaining parts, and the clutch will remain engaged. Should this overrunning tendency allow the spring 51 to unwind, however, as if the auxiliary clutch is disengaged by the gear shift lever, the nut 44 is caused to turn back to the position it occupies in either Figs. 7 or 8. At the same time, however, the rollers on the end of the arms 47 ride up in the cam slots 46 until they occupy substantially the position shown in dotted lines in Fig. 7. This maintains the arms in the position shown in Fig. 4 and holds the main clutch in engaged position. The motor can then act as a brake if the car is running or if the car is being pushed, as is sometimes done in starting a motor, can be turned by the rear wheels until it starts to run on its own power. In the modified forms shown in Figs. 12 and 13, I show shafts 29 and 34 with the flywheel 31, shiftable plate 32 having its hub 33 splined on the shaft 34, and a transmission device including the shifting lever substantially the same as shown in the form previously described. I also employ a similar type of sleeve 41 having a clutch member 52 secured thereto and engaged by a co-operating clutch 53 forming part of the member 54. The pressure plate 39 is engaged by springs 38 and this pressure plate is in turn engaged by bosses 47a on arms 47 pivoted at 48 on the housing 36. A nut 144 threaded on the large threads on the sleeve 41, however, is actuated in a somewhat different manner to control the movement of the arms 47. A plurality of control members 81 are loosely pivoted on pins 82 supported in the housing 36. These members have weighted ends 81a which move radially when the flywheel is rotated through the centrifugal action resulting therefrom. Springs 83 have one end connected to the weighted ends 81a and the other ends supported about pins 84 also supported by the housing 36.

The opposite ends 81b of the members 81 are provided with clutch faces 86 formed arcuately and adapted to engage the periphery of the nut 144 when the weighted ends 81a fly out by centrifugal force.

The spring 51 has one end secured to the sleeve 41 and the opposite end secured to a portion of the nut 144 as in the main embodiment. The nut has an annular projection 144a which engages rollers on the ends of the arms 47. Consequently, when the nut is rotated on the sleeve 41, these arms will be moved about their pivots in a direction to engage the main clutch. The arms are prevented from moving too far out partly by the engagement of their clutch faces with the nut and partly by the spring 83. It is these springs 83 also which return the weights, and in so returning them the pins 84 act as stops to limit the movement of the clutch faces 86 away from the nut and maintain a certain tension on the springs 83 at all times.

The operation of this modified form is not dissimilar to the operation of the main form. When the motor is turning rapidly enough to throw out the weights 81a, the auxiliary clutch faces 86 will engage the nut and turn the nut at engine speed. If there is no load on the sleeve 41, this sleeve will turn with the nut and the main clutch plates will not be engaged. If there is any resistance to turning, however, which happens when the transmission gears have been meshed for driving, the sleeve 41 is held against turning through the auxiliary clutch and the nut rides up on the threads on the sleeve, thereby engaging the main clutch plates. The loose pivots allow the members 81 to move with the nut, it being understood that in actual practice only a very small movement of the nut is sufficient to engage the clutch. Any other loose connection is suitable for the purpose. The same gear shift arrangement including the lower lever 57a, upper lever 58, connections between them and operating connections heretofore described, are employed for disengaging the auxiliary clutch faces 52 and 53. At this time, there is no resistance to turning of the sleeve 41 and it is free to turn at substantially the same speed as the nut 144. The spring 51 then, with the assistance of the springs 38, will move the parts back to the position shown in Fig. 12 and disengage the main clutch.

It will be understood that I may employ modified means for engaging and disengaging the auxiliary clutch. In Figs. 14 and 15, I show two modifications for accomplishing this result. In Fig. 14, the cable 66, operated by a combination gear shift lever of the character described, has its opposite end connected to an arm 88 which controls a valve 89. This valve is connected through a pipe 91 to the intake manifold 92 and also by a pipe 93 to a cylinder 94 in which a piston 96 is reciprocable. This piston has a rod 97 having a connection to an arm 98 which arm is secured to the rocker shaft 69 carrying arms 71 similar to the arms shown particularly in Fig. 6. A line 99 adapted to contain air at atmospheric pressure is connected into the cylinder 94 at the lower side of the piston 96. I have not shown the valve 89 in detail, but it will be understood that a common type of valve for controlling the system alternately to open the line 93 to vacuum or atmospheric pressure by the operation of the arm 88 is satisfactory for my purpose.

In the arrangement shown in Fig. 15, a floor button 101 is provided connected through the floor boards 102 to an arm 103 pivoted at 104. This arm is provided with a link 106 which connects to an arm 88 for controlling the valve 89. The connections 93 and 99, the cylinder 94 and piston 96, as well as the connections to the rocking shaft 69, may be substantially the same as shown in Fig. 14.

What I claim as new and desire to protect by Letters Patent of the United States is:

1. In an automobile drive mechanism, the combination with a driving clutch plate, driven clutch plate, and driven shaft on which the driven clutch plate is splined, of a pressure ring adapted to engage the driven clutch plate, a rotatable sleeve surrounding the driven shaft, a nut threaded on the sleeve, a coil spring having one end connected with the sleeve and the opposite end connected with the nut, connections between said nut and pressure ring whereby movement of the nut in one direction will operate the pressure ring to force the driven clutch plate against the driving clutch plate, means for rotating the nut with the driving clutch plate, an auxiliary shiftable clutch plate between the sleeve and driven shaft, including means for operating said auxiliary shiftable clutch plate, said means including a lower shift lever, an upper shift lever pivoted on the lower shift lever, a cam carried by the upper shift lever, an arm pivoted to the lower shift lever and having one end adapted to be moved about its pivot with respect to the lower shift lever, and means for transmitting motion of said arm to one of the auxiliary clutch members.

2. In an automobile drive mechanism of the character described, a transmission, a clutch mechanism, and means for operating both the transmission and the clutch mechanism, said means including a bi-part gear shift lever comprising an upper lever and an enlarged lower extension thereof, a pivot connection between the two parts, and a universal joint mounting for said lower extension whereby pivotal movement between the two parts is adapted to take place for engaging clutch actuating mechanism preliminary to universal movement of the upper-lever-lower-extension assembly in the lower extension mounting for shifting gears in the transmission.

3. In an automobile drive mechanism of the character described, a transmission, a clutch mechanism, and means for operating both the transmission and the clutch mechanism, said means including a bi-part gear shift lever comprising an upper lever and an enlarged lower extension thereof, clutch actuating mechanism having a portion thereof mounted on said lower extension, a pivot connection between said upper lever and lower extension permitting movement of said upper lever with respect to the lower extension only in a transverse plane to engage said clutch actuating mechanism, and a universal joint mounting for said lower extension permitting universal movement of the upper-lever-lower-extension assembly subsequent to said pivotal movement for shifting gears in the transmission.

4. In an automobile drive mechanism of the character described, a driving shaft, a driving clutch plate having a clutch housing secured thereto with said plate driven by the shaft, a shiftable driven clutch plate, a driven shaft, means for splining said driven clutch plate on the driven shaft, a floating sleeve rotatably supported between said housing and said driven shaft by a bearing around said shaft and a similar bearing around said sleeve and between the sleeve and housing, a nut threaded on the sleeve, an auxiliary clutch member carried by the floating sleeve, a second auxiliary clutch member splined on the driven shaft and adapted to engage with the first mentioned auxiliary clutch member, movable lever mechanism for transmitting movement of the nut on said sleeve to the shiftable clutch plate, means for returning the nut when the auxiliary clutch members are disengaged, a transmission mechanism including a plurality of shiftable gears driven by said driven shaft, and means for disengaging said auxiliary clutch as an incident to the shifting of the gears of said transmission.

5. The combination defined in claim 4 wherein the means for disengaging said auxiliary clutch includes a bi-part gear shift lever comprising an upper lever and an enlarged lower extension thereof, a pivot connection between the two parts, means between said upper lever and said second auxiliary clutch member operated upon pivotal movement of said upper lever to disengage said second auxiliary clutch plate from the first auxiliary clutch plate, and a universal-joint mounting for said lower extension of the lever permitting universal movement of the bi-part lever subsequent to said pivotal movement to shift the gears in the transmission.

6. In an automobile drive mechanism of the character described, a transmission, a clutch mechanism, and means for operating both the transmission and clutch mechanism, said means including a bi-part gear shift lever comprising an upper lever having a cam portion on the lower end thereof, and an enlarged lower lever having a split head for receiving said cam portion, a pivot connection through said split head and said cam portion, a universal-joint mounting for said lower lever, and clutch actuating mechanism having a portion thereof mounted on said lower lever and engaging said cam portion whereby upon initial movement of said bi-part lever in the ordinary shifting, said cam will engage said mechanism to operate the clutch, and whereby the shifting of said bi-part lever may be continued through a universal movement in said universal joint mounting to shift the gears in the transmission.

7. In an automobile drive mechanism, a main clutch including a driving and shiftable driven plate, an auxiliary clutch including a pair of clutch members shiftable with respect to each other, means controlled by the engagement of the auxiliary clutch for engaging the main clutch, a transmission mechanism, a gear shift lever for operating the transmission mechanism but having a portion which has some preliminary lost motion at the beginning of each gear shifting movement, and means actuated in response to initial movement of said portion for disengaging the auxiliary clutch whereby to disengage the main clutch, said last named means including a laterally extending lever pivoted to said gear shift lever and having a roller on one end and a flexible shaft secured to the other end, and a lever connection between said flexible shaft and auxiliary clutch whereby upon initial movement of said portion of said gear shift lever in the ordinary shifting direction, said roller will be actuated to swing said horizontal lever to transmit said movement through the shaft and lever to the auxiliary clutch.

8. In an automobile drive mechanism, a main clutch including a driving clutch plate and a driven clutch plate, said driven clutch plate being shiftable to disengage the clutch, means including a vacuum operated piston for disengaging the shiftable clutch plate, a transmission mechanism, a combination gear shift clutch operating lever having a portion which has some preliminary lost motion at the beginning of each gear shifting operation, and means operated in response to initial movement of said portion for actuating the clutch disengaging means, said actuating means including a pivoted lever on said gear shift lever, a connection from the intake manifold to the cylinder for the vacuum operated piston with a valve interposed between the same, a flexible shaft from said pivoted lever to said valve, and connecting means between said piston and said driven clutch plate whereby upon initial movement of said portion of said shift lever in the ordinary shifting direction said pivoted lever will be moved to operate the valve for operating the piston to disengage the clutch.

9. In an automobile drive mechanism of the character described, a transmission and a clutch mechanism, and means for operating both the transmission and the clutch mechanism, said means including a bi-part gear shift lever comprising a lower lever operatively connected to the transmission and suitably mounted to be pivotable in a gear shifting direction, an upper lever pivoted to said lower lever and pivotable in the same gear shifting direction with respect thereto whereby a single gear shifting movement of said upper lever may cause its movement with respect to said lower lever before moving said lower lever, means for limiting the movement of said upper lever and means actuated by a relative movement between said levers for operating said clutch mechanism.

10. In an automobile drive mechanism of the character described, a transmission clutch mechanism, and means for operating both the transmission and the clutch mechanism, said means including a bi-part gear shift lever comprising a lower lever operatively connected to the transmission and suitably mounted to be pivotable in opposite gear shifting directions, an upper lever pivoted to said lower lever and pivotable from a normal position with respect thereto in the same gear shifting directions with respect thereto whereby a single gear shifting movement of said upper lever may cause its movement with respect to said lower lever before moving said lower lever, means for limiting the movement of said upper lever and means actuated by a relative movement between said levers in either direction from their normal relative positions for operating said clutch mechanism.

11. In an automobile drive mechanism of the character described, a transmission and a clutch mechanism, and means for operating both the transmission and the clutch mechanism, said means including a bi-part gear shift lever comprising a lower lever operatively connected to the transmission and suitably mounted to be pivotable in a gear shifting direction, an upper lever pivotably carried by said lower lever and pivotable in the same gear shifting direction with respect thereto whereby a single gear shifting movement of said upper lever may cause its movement with respect to said lower lever before moving said lower lever, and means for causing said lower lever to move in response to the movement of said upper lever and means actuated by a relative movement between said levers for operating said clutch mechanism.

12. In an automobile drive mechanism of the character described, a transmission and a clutch mechanism, and means for operating both the transmission and the clutch mechanism, said means including a bi-part gear shift lever comprising a lower lever operatively connected to the transmission and suitably mounted to be pivotable in a gear shifting direction, an upper lever pivotably carried by said lower lever and pivotable in the same gear shifting direction with respect thereto whereby a single gear shifting movement of said upper lever may cause its movement with respect to said lower lever before moving said lower lever, means for causing said lower lever to move in response to the movement of said upper lever, and means actuated by a relative movement between said levers for operating said clutch mechanism, said last named means causing the engagement of said clutch mechanism only after the lapse of a brief time interval after said levers return to their normal alinement.

13. In an automobile drive mechanism, a main clutch including a driving and shiftable driven plate, an auxiliary clutch including a pair of clutch members shiftable with respect to each other, means controlled by the engagement of the auxiliary clutch for engaging the main clutch, a transmission mechanism, a gear shift lever for operating the transmission mechanism but having a portion which has some preliminary lost motion at the beginning of each gear shifting movement, and means actuated in response to initial movement of said portion for disengaging the auxiliary clutch whereby to disengage the main clutch, said main clutch becoming again engaged only after the lapse of a brief time interval after said auxiliary clutch has again become engaged.

14. In an automobile drive mechanism of the character described, a transmission and a clutch mechanism, and means for operating both the transmission and the clutch mechanism, said means including a bi-part gear shift lever comprising a lower lever operatively connected to the transmission and suitably mounted to be pivotable in a gear shifting direction, an upper lever pivotably carried by said lower lever and pivotable in the same gear shifting direction with respect thereto whereby a single gear shifting movement of said upper lever may cause its movement with respect to said lower lever before moving said lower lever, means for causing said lower lever to move in response to the movement of said upper lever, and means actuated by a relative movement between said levers for operating said clutch mechanism, including a pilot clutch disengaged by force exerted by said levers and means driven through said pilot clutch when engaged for causing an engaging movement of said clutch mechanism as long as there is relative rotation between its parts.

15. In an automobile drive mechanism of the character described, a transmission and a clutch mechanism, means for operating both the transmission and the clutch mechanism, said means including a bi-part gear shift lever comprising a lower lever operatively connected to the transmission and suitably mounted to be pivotable in a gear shifting direction, an upper lever pivotably carried by said lower lever and pivotable in the same gear shifting direction with respect thereto whereby a single gear shifting movement of said upper lever may cause its movement with respect to said lower lever before moving said lower lever, and resilient means tending to cause said lower lever to shift to follow any shift of the upper lever.

HANS F. KOLB.